United States Patent [19]

Coffman

[11] 4,341,996
[45] Jul. 27, 1982

[54] SPEED MEASURING APPARATUS FOR INDICATING PERCENTAGE OF NOMINAL FULL SPEED, ACCELERATION AND DECELERATION

[75] Inventor: Kenneth L. Coffman, Indianapolis, Ind.

[73] Assignee: The United States of America as represented by the Secretary of the Navy, Washington, D.C.

[21] Appl. No.: 265,475

[22] Filed: May 20, 1981

[51] Int. Cl.³ .......................... G01P 3/42; G01P 15/00
[52] U.S. Cl. .................................... 324/162; 324/166; 73/489; 73/514; 364/566
[58] Field of Search ................. 324/162, 166; 73/489, 73/514, 517 R; 364/565, 566; 340/669, 670

[56] References Cited

U.S. PATENT DOCUMENTS

| | | | |
|---|---|---|---|
| 2,720,361 | 10/1955 | Halley | 73/489 X |
| 3,304,496 | 2/1967 | Lorenz | 324/87 |
| 3,559,008 | 1/1971 | Stut et al. | 318/8 |
| 3,714,538 | 1/1973 | Albrecht et al. | 321/1 |
| 3,757,167 | 9/1973 | Yoshikawa et al. | 317/5 |
| 3,783,339 | 1/1974 | Matty | 317/5 |
| 3,798,907 | 3/1974 | Barrett et al. | 60/660 |
| 3,886,406 | 5/1975 | Anderson | 317/5 |
| 4,028,686 | 6/1977 | Wilson et al. | 340/195 |
| 4,115,831 | 9/1978 | Minakuchi | 361/236 |

Primary Examiner—Stanley T. Krawczewicz

[57] ABSTRACT

A speed measuring apparatus is provided for indicating a percentage of nominal full speed RPM of a jet engine and also for indicating time required for accelerating and decelerating the engine. A generator output is converted to a square wave and a time interval measurement is made between zero crossings of the square wave. The square wave controls the starting and stopping of a time period counter and measured time is converted to percent RPM which is displayed on a digital incandescent display. Similar time periods are measured when the engine is advanced from idle to full power, and also when the engine is retarded from full power to idle.

8 Claims, 1 Drawing Figure

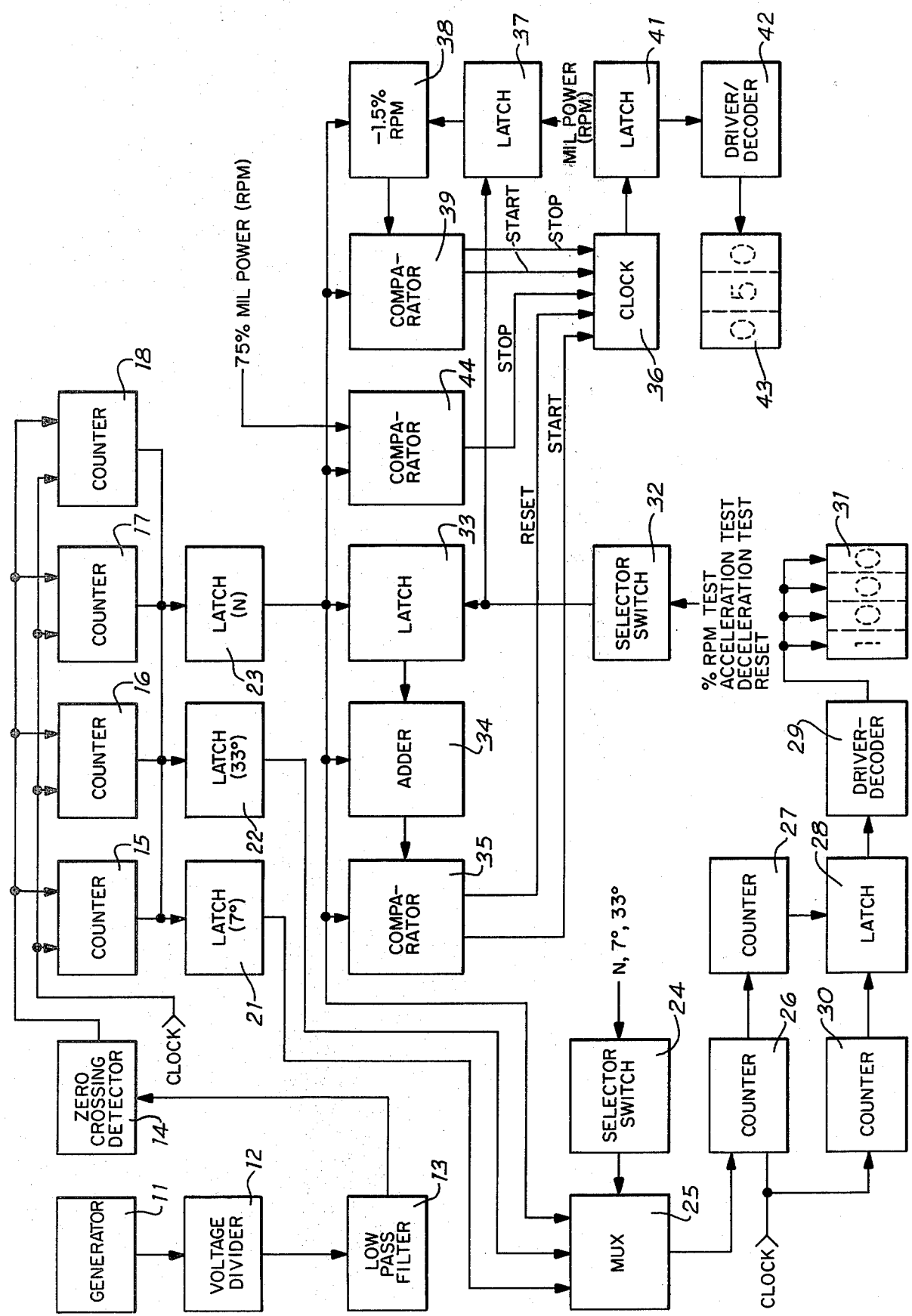

SPEED MEASURING APPARATUS FOR INDICATING PERCENTAGE OF NOMINAL FULL SPEED, ACCELERATION AND DECELERATION

BACKGROUND OF THE INVENTION

The present invention relates to a speed measuring device and more particularly to a device for determining various speed parameters of a jet engine such as determining time required to reach a percentage of nominal design speed, time to accelerate from idle to a desired speed and time to decelerate from full throttle speed to a desired speed.

Various measuring devices are employed for determining or detecting the speed of a mechanical element, particularly a rotating element. For example, in U.S. Pat. No. 4,028,686, entitled, "Digital Detector", which issued June 7, 1977, to Michael A. Wilson and Gordon E. Gee, a device is provided for measuring the speed of each driver wheel of a truck and comparing the speeds electronically to denote a skidding condition of a vehicle.

Another speed measuring system is described in U.S. Pat. No. 3,886,406, which issued May 27, 1975, to Robert F. Anderson. This system is used to detect an overspeed condition and uses a tachometer which generates a frequency comparable to vehicle speed. A detector relay is energized if the frequency generated by the tachometer becomes above the frequency of a high-pass filter.

SUMMARY OF THE INVENTION

The present invention relates to a speed measuring device for a jet engine and more particularly to a measuring device which will provide a digital reading representing a percentage of nominal full speed RPM of a jet engine.

A jet engine for a military aircraft is designed so that it will rotate at a given number of revolutions per minute at military (MIL) power. For example, MIL power might be obtained at 4200 RPM. In testing and adjusting an engine, various test readings are made when the engine is rotating at a percentage of military power. For example, in one acceleration test, timing is started at 0.4% RPM greater than idle speed and is stopped at 98.5% MIL. Thus it can be seen that it would be convenient during testing to have a measuring device which will show or display the % RPM of an engine being tested and it is an object of the present invention to provide such a measuring device.

A generator mounted on the engine provides a frequency output proportional to the engine RPM and this frequency output is used as an input to circuitry which converts the signals to % RPM. The frequency output of the generator is converted to a square wave and a time interval measurement is made between zero crossings of the square wave. The square wave controls the starting and stopping of a time period counter and measured time is converted to % RPM which is displayed on a digital incandescent display.

It is therefore a general object of the present invention to provide a speed measuring device for a jet engine which will provide an output reading indicative of a percent of military power.

Other objects and advantages of the present invention will become apparent from the following detailed description of the invention when considered in conjunction with the accompanying drawing.

BRIEF DESCRIPTION OF THE DRAWING

The FIGURE is a simplified block diagram of a preferred embodiment of the present invention.

DESCRIPTION OF THE PREFERRED EMBODIMENT

Referring now to the drawing, a generator 11 which is mounted on a jet engine provides a frequency output proportional to the engine RPM. The output of generator 11 is first amplitude limited by voltage divider 12 and then filtered by a low pass filter 13 to eliminate any high frequency component from the sine wave produced by generator 11. After filtering the sine wave, it is fed to a zero crossing detector 14 to produce a square wave. This square wave, in turn, controls the starting and stopping of counters 15, 16, 17, and 18. Counters 15–18 are clocked to count 70,000 times per second and the digital representation of the time period is then stored in latches 21, 22, and 23.

As the speed of a jet engine being tested is increased, the angle of inlet guide vanes in the engine is changed and it is desired to know the engine RPM when the inlet guide vanes are at a 33 degree angle and also at a 7 degree angle. Latch 21 is used to store the RPM count when the inlet guide vanes are at a 7 degree angle and latch 22 is used to store the RPM count when the inlet guide vanes are at a 33 degree angle. A switch 24 is provided for selecting a desired output from one of latches 21, 22, or 23 to be applied to multiplexer 25.

The count in latch 23 is converted to % RPM by loading the inverted digital representation of the time period into binary counter 26. Counter 26 is fed with a 10 MHz clock and is counted to terminal count. Each time counter 26 reaches terminal count it is loaded again with the inverted digital representation of the time period and also, each time counter 26 reaches terminal count, counter 27 is incremented one count. The number of counts in counter 27 after 100 ms is a digital representation of % RPM. The information in counter 27 is then latched by latch 28 and fed to a driver-decoder 29 which, in turn, drives the % RPM incandescent display 31.

An acceleration circuit is provided for measuring and indicating the time (in seconds) required for an engine to accelerate from idle speed to Mil-Power speed less 1.5%. The acceleration test starts when the throttle linkage is advanced from an idle position to a full power position.

Referring again to the drawing, a selector switch 32 is provided for switching the circuitry to an acceleration test mode. Latch 33 stores a time period equivalent of idle % RPM and adder 34 adds the time period equivalent of 0.4% RPM to the information in latch 33. The output of adder 34 (time period equivalent of idle speed plus 0.4% RPM) is stored in comparator 35 and, when the RPM signal value from latch 23 exceeds the RPM value stored in comparator 35, comparator 35 sends a signal to start clock 36. Latch 37 stores a time period equivalent of military power % RPM and a time period equivalent of 1.5% RPM is subtracted from the information in latch 37 and the information is stored in comparator 39. When the RPM value stored in latch 23 becomes greater than the RPM value stored in comparator 39, a signal is sent to stop the running of clock 36. Thus, clock 36 runs from a speed of idle +0.4% RPM to a speed of Mil-power RPM less 1.5% RPM and this time (in seconds) is then displayed on incandescent display 43 through latch 41 and driver/decoder 42.

A deceleration circuit is also provided for measuring and indicating the time (in seconds) required for an engine to decelerate from full Mil-power RPM less 1.5% RPM to 75% RPM. Selector switch 32 is switched to the deceleration test mode and comparator 39 stores a value representing military power less 1.5% RPM. When the RPM value in latch 23 becomes less than the value stored in comparator 39, a signal is sent to start clock 36. Comparator 44 has a value stored representing 75% RPM and, when the value from latch 23 become less than the stored value in comparator 44, a signal is sent to stop clock 36. The running time of clock 36 is known as engine deceleration time and this time is displayed through latch 41 and driver/decoder 42 to incandescent display 43.

OPERATION

In operation, the speed measuring apparatus of the present invention is connected with the output of a generator 11 of an engine and the frequency outputs of generator 11 are proportional to the engine RPM. The circuitry above-described converts the output signals to % RPM by measuring the period of a square wave with a 70 KHz time base. The measured period which is recorded in counters 15-18 is latched, complimented and presented to the % RPM conversion circuitry. Counter 26 is fed with a 10 MHz time base and is counted to terminal count. Each time counter 26 reaches terminal count, it is reloaded with the complimented period and counter 27 is incremented up one count. The number of counts in counter 27 after 10 milliseconds is representation of % RPM. This representation is then latched and displayed by incandescent display 31.

In testing a military jet engine, it is desirable to know % RPM for two inlet guide vane angles, that is for a 7 degree angle and for a 33 degree angle, and latches 21 and 22 are provided for holding the count for these two angles. Selector switch 24 is actuated when read-out of either latch 21 or 22 is desired.

Selector switch 32 is actuated when an acceleration test is to be made. Comparator 35 starts the running of clock 36 when a desired starting speed is reached (idle speed plus 0.4% RPM) and comparator 39 stops the running of clock 36 when the desired maximum speed is reached (MIL power less 1.5% RPM). The time (in seconds) that clock 36 has been running is displayed by incandescent display 43.

Selector switch 32 is also actuated when a deceleration test is to be made. Comparator 39 starts the running of clock 36 and comparator 44 stops clock 36. Again, the time of running of clock 36 is displayed by incandescent display 43.

It can thus be seen that the present invention provides speed readings of a jet engine which are a percentage of a desired speed and that these direct percentage readings are useful in making various operational tests of an engine.

Obviously many modifications and variations of the present invention are possible in the light of the above teachings. It is therefore to be understood that the invention may be practiced otherwise than as specifically described.

I claim:

1. A speed measuring device for indicating a percent of full speed design RPM of an engine comprising,
   signal means for providing frequency signals proportional to rotational speed of an engine,
   first counter means for counting a fixed rate,
   means connected with said signal means for starting and stopping said first counter means wherein the count made by said first counter means represents RPM of said engine,
   second counter means for counting a fixed rate and connected with said first counting means for converting said count in said first counter means to a value representing a percent of said full speed design RPM of said engine, and
   means for displaying said value.

2. A speed measuring device for indicating a percent of full speed design RPM of an engine as set forth in claim 1 wherein said signal means for providing frequency signals proportional to rotational speed of an engine is a generator.

3. A speed measuring device for indicating a percent of full speed design RPM of an engine as set forth in claim 1 wherein said means connected with said signal means for starting and stopping said first counter means includes a zero crossing detector.

4. A speed measuring device for indicating a percent of full speed design RPM of an engine as set forth in claim 1 having a clock connected with said signal means and having means for starting said clock at a low speed of said engine and stopping said clock at a higher speed of said engine and having means for displaying the time of operation of said clock to provide an acceleration test of said engine.

5. A speed measuring device for indicating a percent of full speed design RPM of an engine as set forth in claim 1 having a clock connected with said signal means and having means for starting said clock at a high speed of said engine and stopping said clock at a lower speed of said engine and having means for displaying the time of operation of said clock to provide a deceleration test of said engine.

6. A speed measuring device for indicating a percent of full speed design RPM of an engine comprising,
   a generator for providing frequency signals proportional to rotational speed of an engine,
   first counter means for counting at a fixed rate,
   a zero crossing detector connected with said generator for starting and stopping said first counter means wherein the count made by said first counter means represents RPM of said engine,
   second counter means for counting a fixed rate and connected with said first counting means for converting said count in said first counter means to a value representing a percent of said full speed design RPM of said engine, and
   an incandescent display for displaying said value.

7. A speed measuring device for indicating a percent of full speed design RPM of an engine as set forth in claim 6 having a clock connected with said generator and having means for starting said clock at a low speed of said engine and stopping said clock at a higher speed of said engine and having means for displaying the time of operation of said clock to provide an acceleration test of said engine.

8. A speed measuring device for indicating a percent of full speed design RPM of an engine as set forth in claim 6 having a clock connected with said generator and having means for starting said clock at a high speed of said engine and stopping said clock at a lower speed of said engine and having means for displaying the time of operation of said clock to provide a deceleration test of said engine.

* * * * *